United States Patent
Beasley

(10) Patent No.: US 8,500,059 B2
(45) Date of Patent: Aug. 6, 2013

(54) HELICOPTER ROTOR BLADE TIE DOWN SYSTEM

(76) Inventor: Ronald L. Beasley, Port Richey, FL (US)

( * ) Notice: Subject to any disclaimer, the term of this patent is extended or adjusted under 35 U.S.C. 154(b) by 290 days.

(21) Appl. No.: 12/983,917

(22) Filed: Jan. 4, 2011

(65) Prior Publication Data
US 2012/0167352 A1 Jul. 5, 2012

(51) Int. Cl.
*B64D 45/00* (2006.01)

(52) U.S. Cl.
USPC ............................ 244/1 R; 244/17.11; 294/22

(58) Field of Classification Search
USPC ..... 244/1 R, 17.11, 17.23, 17.17, 110; 269/3, 269/6, 95, 902; 294/17, 23.5, 209–211, 22, 294/19.1, 81.54, 26, 1.5; 24/302, 280; 29/255, 29/270, 278; 258/12, 14, 21, 24; 383/33; 141/390; 248/99
See application file for complete search history.

(56) References Cited

U.S. PATENT DOCUMENTS

| | | | |
|---|---|---|---|
| 2,488,396 A * | 11/1949 | Gottholm | ............................ 294/2 |
| 2,532,316 A * | 12/1950 | Larkin | ............................ 150/154 |
| 2,609,164 A * | 9/1952 | Dillon | ............................ 150/157 |
| 4,022,546 A | 5/1977 | Drees et al. | |
| 4,606,516 A * | 8/1986 | Willison | ........................ 244/121 |
| 4,613,096 A | 9/1986 | Pugh | |
| 5,127,265 A * | 7/1992 | Williamson et al. | ............. 73/182 |
| 5,211,538 A * | 5/1993 | Seghal et al. | ...................... 416/1 |
| 6,749,151 B1 | 6/2004 | Ross | |
| 6,772,483 B1 | 8/2004 | Saunders | |
| 6,943,301 B2 * | 9/2005 | Lee | ............................ 174/138 R |
| 7,131,610 B2 | 11/2006 | Swadling | |
| 8,214,989 B1 * | 7/2012 | Jefferson et al. | ................. 29/271 |
| 2005/0178901 A1 | 8/2005 | Warin et al. | |

OTHER PUBLICATIONS

Rotor blade tie-down; East Coast Scale Helicopters; shows a rotor blade tie down for a model helicopter; Oct. 5, 2010; http://us.vario-helicopter.biz/shop/product_info.php?products_id=34909&idse0=100.

"Tech Sheet: Bell 206L Longranger"; Web site for Bruce's Custom Covers relates to blade covers and tie downs for helicopter rotor blades, http://www.aircraftcovers.com/index.php?cPath=762_784_795&tpIDir=fallback.

(Continued)

*Primary Examiner* — Timothy D Collins
*Assistant Examiner* — Brian M O'Hara
(74) *Attorney, Agent, or Firm* — Lonnie R Drayer

(57) ABSTRACT

A solution to the problem one person tying down the rotor blades of a helicopter when the rotor blades are too high to be reached by a person standing on the ground involves a rotor blade tie down having a flat structure of two adjacent layers attached along three sides and open on one side to facilitate the placement of an end of the rotor blade in an interior of the device. An exterior surface of each of the layers of the flat structure has a member fixed thereto adjacent the open side of the tie down for receiving a rotor blade tie down installation tool. A tether has one end fixed to the tie down and a free end for attachment to a structural member of the helicopter. A helicopter rotor blade tie down installation tool is a pole having a pair of spaced apart substantially parallel arms fixed to the pole that extend away from the pole and are oriented substantially perpendicular to the pole to be received in the members on the exterior of the rotor blade tie down device.

11 Claims, 9 Drawing Sheets

OTHER PUBLICATIONS

Department of the Army TM 1-1520-238-23-1 for "Helicopter Attack, AH-64A Apache"; Section 1.06 Main Rotor Blades Tiedown—Installation, issued May 16, 1994, http://www.tpub.com/frontmatter/TM-1-1520-238-23-10001.gif and http://www.tpub.com/content/ahapache/TM-1-1520-238-23-1/css/TM-1-1520-238-23-1_432.htm.

* cited by examiner

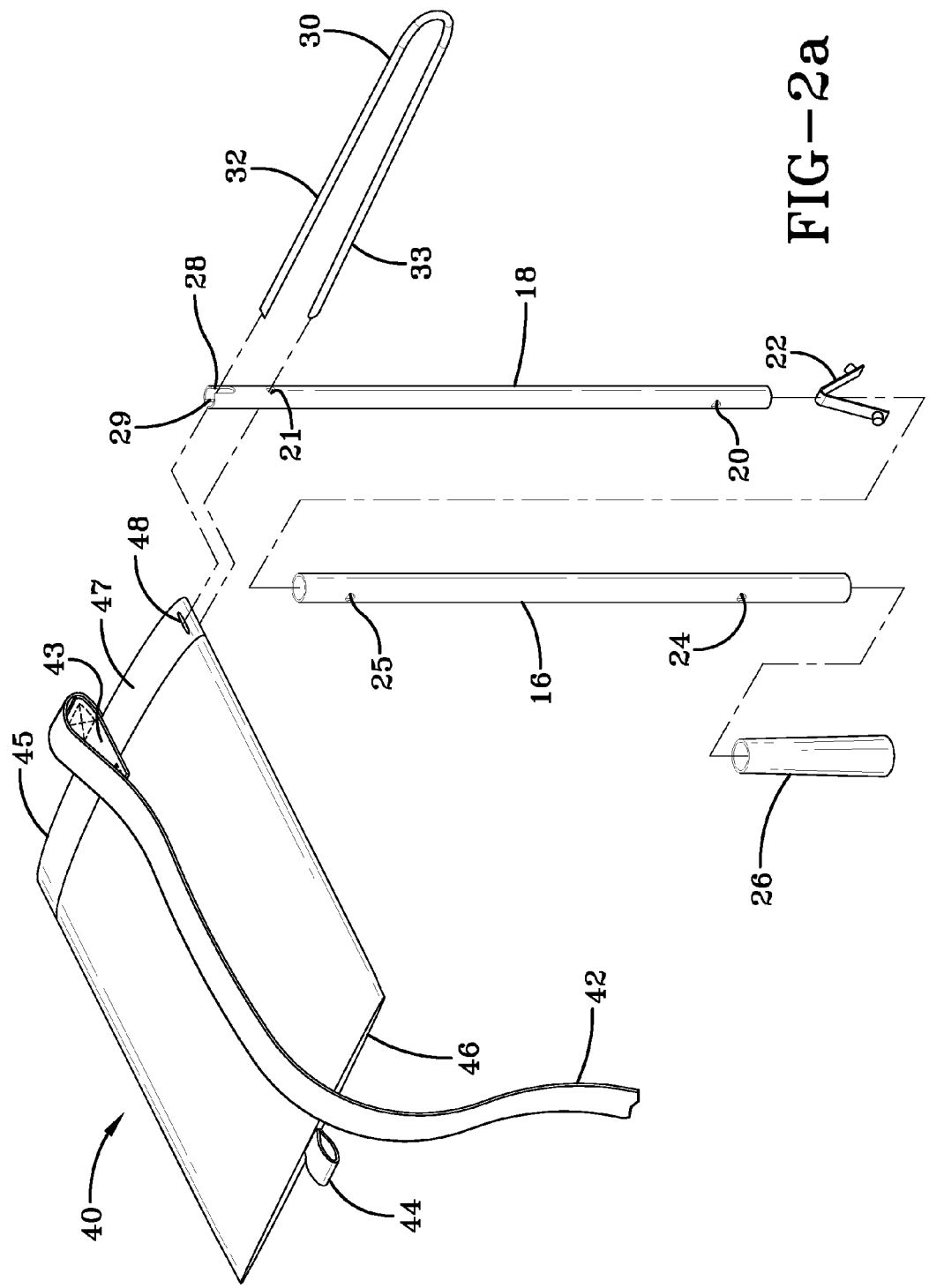

HELICOPTER ROTOR BLADE TIE DOWN SYSTEM

FIELD OF INVENTION

The present invention relates to a tie down device for securing a rotor blade of a parked helicopter from excessive movement and a tool for installing the tie down device on a helicopter rotor blade.

BACKGROUND OF THE INVENTION

With reference to FIG. 1, the rotor blades 12 of a helicopter 10 that is parked in an open environment are subject to damage in the event of a strong wind. The wind damage can be mitigated by tying down the rotor blades to prevent excessive lateral movement. A problem to be overcome if the rotor blades are to be tied down is that the rotor blades 12 are too high off the ground for a person 14 standing on the ground to reach the rotor blades. Of course a person can access a rotor blade by standing on a ladder or step stool. Cargo space inside a smaller helicopter is very limited, so transporting a ladder or stool on a regular basis is not convenient. If the person 14 is a pilot that has flown his helicopter 10 to a remote location and high winds are imminent, the pilot has heretofore faced a serious problem that up to now has not been conveniently alleviated. A solution that allows a single person, even one of short stature, to tie down the rotor blades in such a situation is provided by a rotor blade tie down device and rotor blade tie down device installation tool of the present invention.

DISCUSSION OF THE PRIOR ART

U.S. Pat. No. 4,022,546 discloses the need to tie down helicopter rotor blades, and in FIG. 7 teaches that the outboard end of a rotor blade should be provided with a receptacle for securing the rotor blade to the fuselage or a ground anchor. However, U.S. Pat. No. 4,022,546 does not disclose how the rotor blade is to be accessed.

U.S. Pat. No. 4,613,096 shows and describes pockets that fit over the end portions of rotor blades with straps extending from the pockets to fastening locations on the helicopter. U.S. Pat. No. 4,613,096 does not disclose details of the structure of the pockets or how this rotor blade tie down system is to be installed.

U.S. Pat. No. 6,772,483 B1 discloses rotor boots that are placed over the tips of helicopter rotor blades and secured to tie down rings with rope securing devices to maintain tension on the rotor blades. U.S. Pat. No. 6,722,783 B1 does not disclose details of the structure of the rotor boots or how the rotor boots are to be installed.

U.S. Pat. No. 6,749,151 B1 teaches a canopy that can be installed above a helicopter and employs sleeve positioned over the end of each rotor blade to anchor the canopy in place. U.S. Pat. No. 6,749,151 B1 does not disclose details of the structure of the sleeves or how the sleeves are to be installed. U.S. Pat. No. 7,131,610 B2 is a continuation-in-part of U.S. Pat. No. 6,749,151 B1 and makes the same disclosures as U.S. Pat. No. 6,749,151 B1.

US 2005/0178901 A1 discloses lashing down rotor blades, but does not use sleeves.

SUMMARY OF INVENTION

There is provided in accordance with one aspect of the present invention a helicopter rotor blade tie down device comprising a flat structure having two adjacent layers attached along three sides and open on one side. Each of the layers comprises a fabric made of natural or synthetic fibers. An exterior surface of each of the layers of the flat structure has a sleeve fixed thereto that extends parallel to and adjacent to the open side of the flat structure. Each sleeve has an opening for receiving a helicopter rotor blade tie down installation tool. A tether has an end fixed to the device and a free end for attachment to a structural member of a helicopter. The tether is fixed to the device adjacent the open side of the flat structure and one of the sleeves.

There is provided in accordance with another aspect of the invention a helicopter rotor blade tie down installation tool comprising a pole having a pair of spaced apart substantially parallel arms fixed to the pole that extend away from the pole and are oriented substantially perpendicular to the pole to be received in members on the exterior of a helicopter rotor blade tie down device. The pole may be a telescoping pole. The substantially parallel arms may be the arms of a U shaped member that is fixed to the pole in a detachable manner with the base of the U shaped member proximal to the pole. The pole may be hollow and the pole may have a pair of diametrically opposed parallel slots extending from an end of the pole. The pole may have a pair of aligned passageways extending therethrough. The U shaped member is attached to the pole in a detachable manner by extending one of the arms of the U through the slots and one of the arms through the passageways.

BRIEF DESCRIPTION OF THE DRAWINGS

For a fuller understanding of the invention, reference should be made to the following detailed description, taken in connection with the accompanying drawings.

FIG. 2a is an exploded view of the tool with the rotor blade tie down.

DETAILED DESCRIPTION OF THE INVENTION

A helicopter rotor blade tie down installation tool in accordance with the present invention comprises a pole having a pair of spaced apart substantially parallel arms fixed to the pole that extend away from the pole and are oriented substantially perpendicular to the pole to be received in members on the exterior of a helicopter rotor blade tie down device. A person standing at ground level is able to access a helicopter rotor blade that is too high to reach is able to access the rotor blade and install a rotor blade tie down that will be disclosed herein using the installation tool described below in detail.

Figure 1:
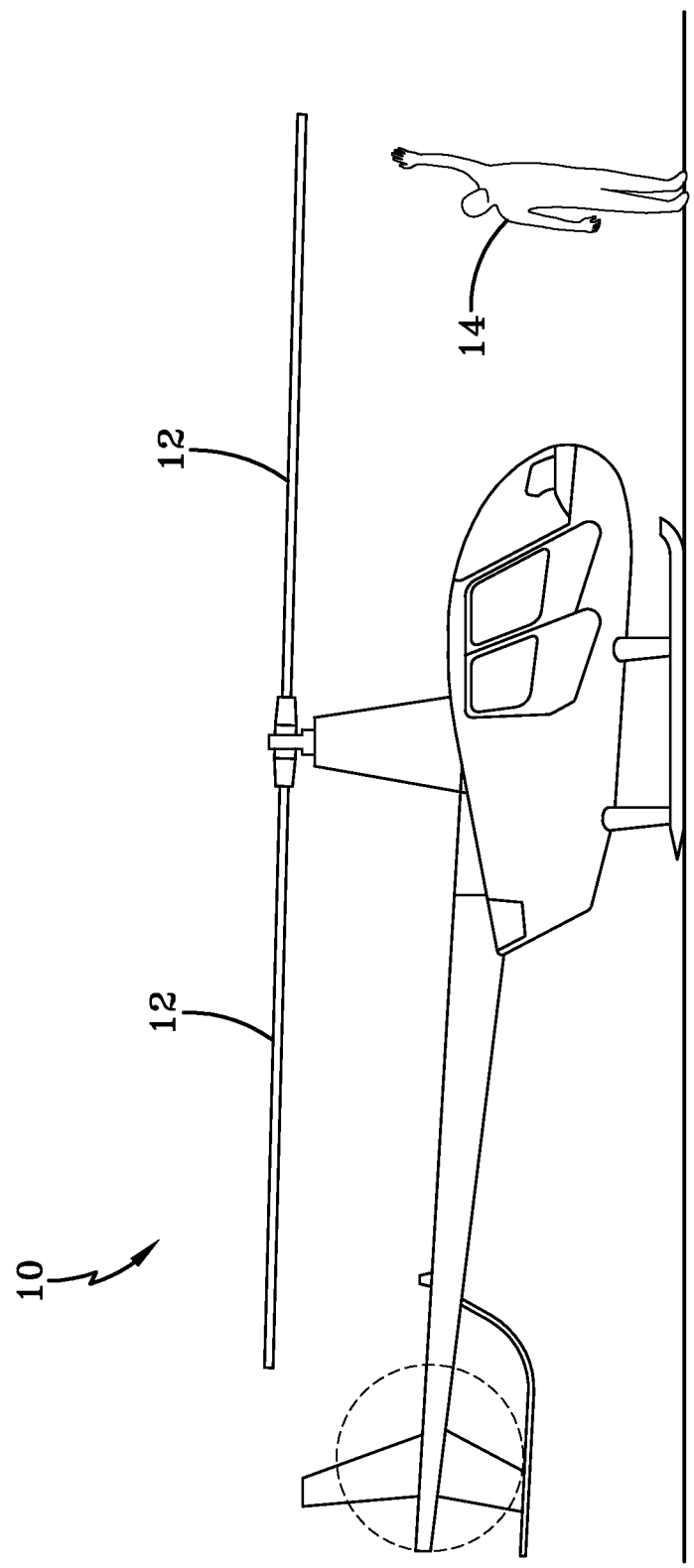
FIG. 1 is a side elevation view of a helicopter and a person.
Figure 2:
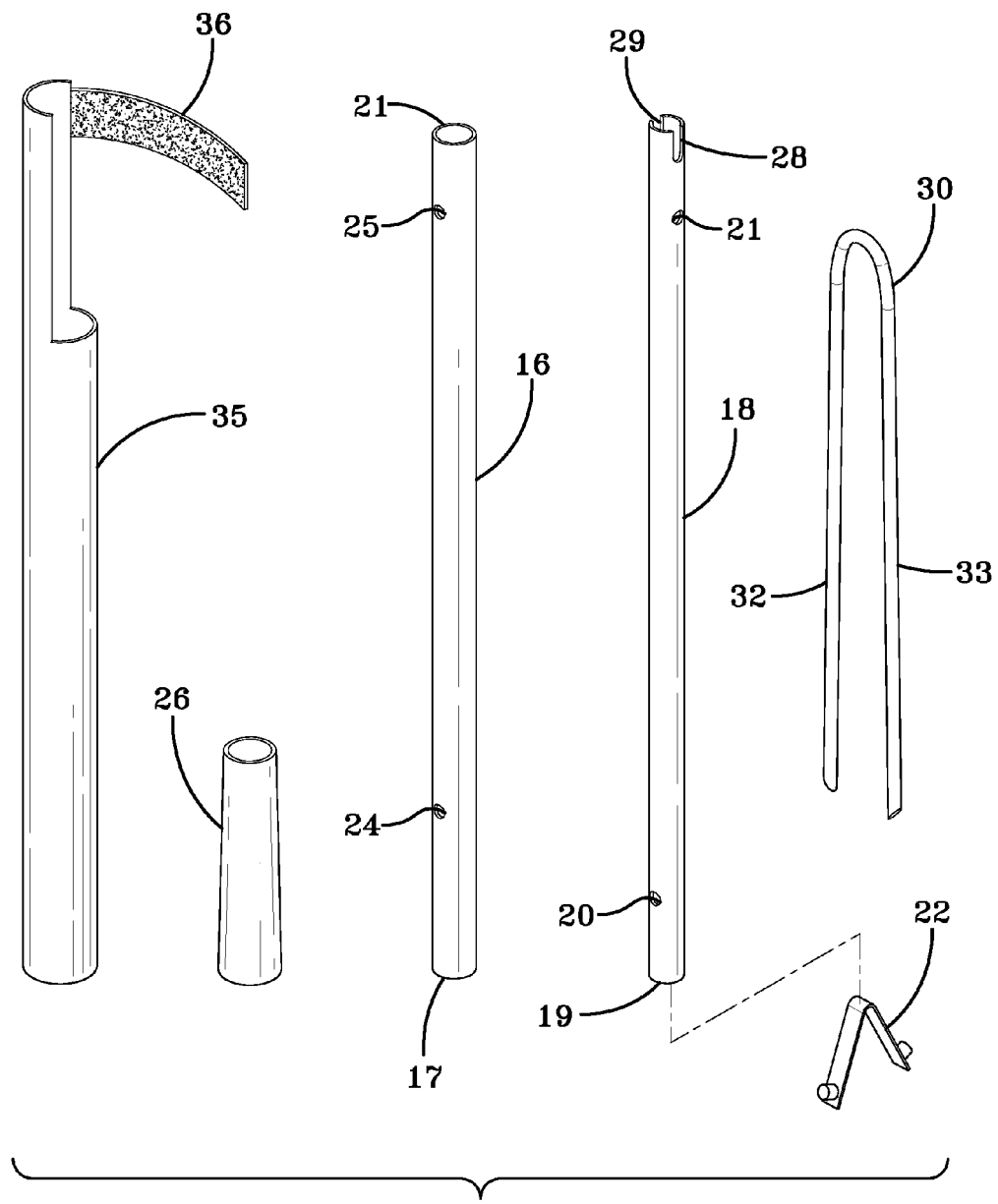
FIG. 2 is an exploded view of a first embodiment of a tool for installing a helicopter rotor blade tie down.

Referring first to FIGS. 2 and 2a, there is shown an exploded view of a first embodiment of a tool for installing a helicopter rotor blade tie down. An extendable pole has two hollow telescoping pole sections 16, 18. A first pole section 16 has an inside diameter that is slightly larger than the outside diameter of a second pole section 18 which allows the second pole section to be inserted into the first pole section. A spring loaded locking device 22 is placed into the interior of the second pole section through a first end 19 of the second pole section with buttons of the locking device protruding through diametrically opposed holes 20 in the second pole section. The second pole section is inserted into the first pole section with a pair of diametrically opposed holes 24 in the first pole section aligned with the diametrically opposed holes 20 in the second pole section whereby the buttons of the locking device extend through the aligned holes in the two pole section when the extendable pole is in a collapsed configuration. A handle 26 has an interior diameter that is sized to receive the first end 17 of the first pole section. To convert the extendable pole into an extended configuration for use in placing a helicopter rotor blade tie down device 40 on a helicopter rotor blade, the buttons of the locking device are depressed through the holes 24 in the first pole section 16. Next the second pole section 18 is pulled through a second end 21 of the first pole section until the buttons of the locking device 22 extend through a second set of diametrically opposed holes 25 in the first pole section that are aligned with the diametrically opposed holes 20 in the second pole section whereby the buttons of the locking device extend through the aligned holes in the two pole sections when the extendable pole is in an extended configuration.

Figure 4:
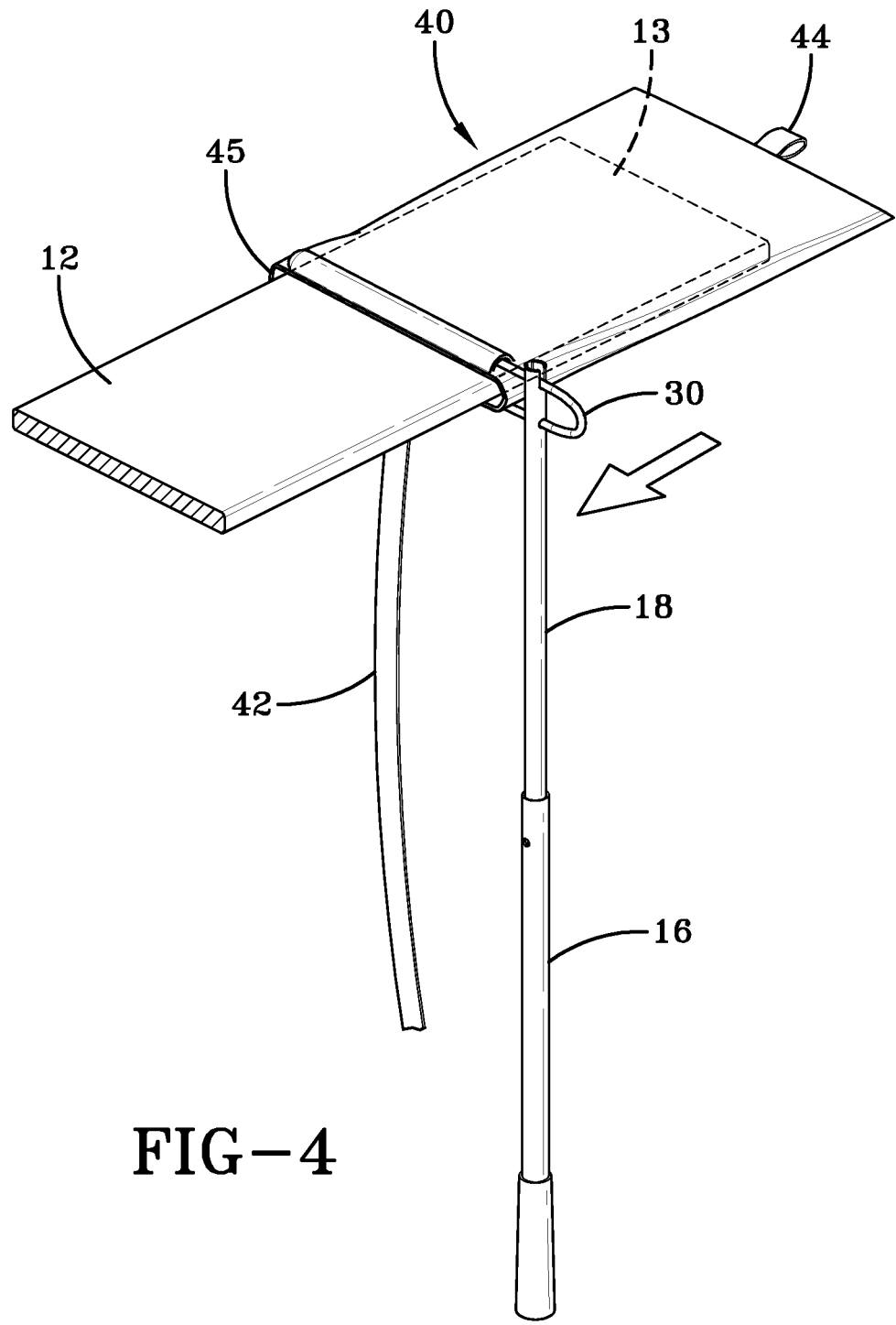
Figure 4A:
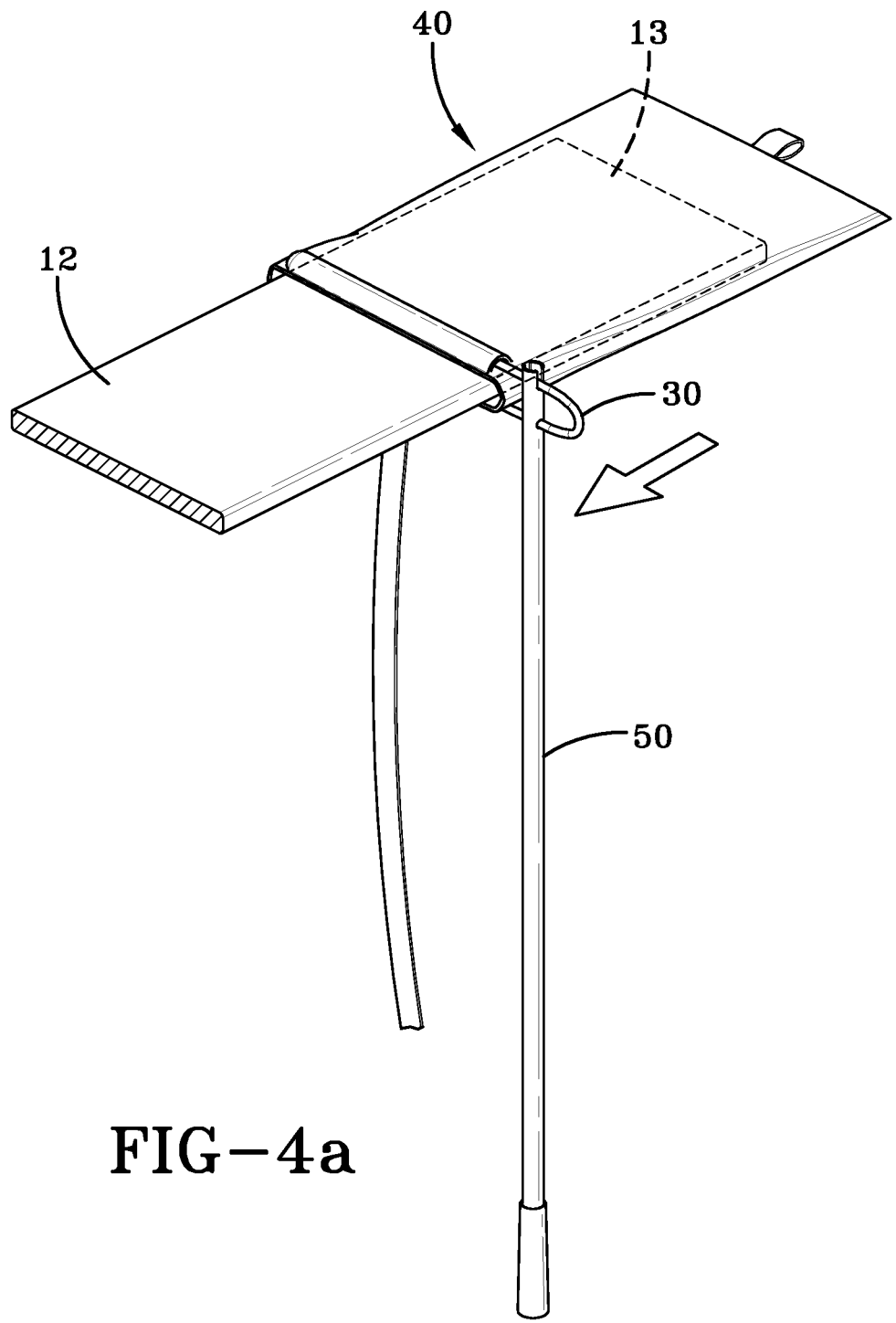
FIG. 4a shows a second embodiment of a tool for installing a helicopter rotor blade tie down being used to place the helicopter rotor blade tie down on a rotor blade.

It is understood that the pole of a tool for installing a helicopter rotor blade tie down does not have to be an extendable pole. For example in FIG. 4*a* the pole 50 is a single piece pole. If the tool for installing a helicopter rotor blade tie down is to be transported in a smaller helicopter, for example a helicopter designed to seat not more than four persons, it is preferable that the pole be an extendable pole so that it will fit more readily inside the passenger compartment of a helicopter. It is further understood that the pole may simply be a pole comprising two pole sections that are separate when stored but that fit together in any suitable manner including only an end portion of one pole section fitting into an end portion of the other pole section. Therefore, as used herein and in the claims the term "pole" in the absence of an adjective is understood to refer to either a single piece pole or a pole made up of more than one section.

A pole of a helicopter rotor blade tie down installation tool of the present invention has a pair of spaced apart substantially parallel arms 32, 33 fixed to the pole that extend away from the pole and are oriented substantially perpendicular to the pole. As used herein and in the claims the term "substantially parallel" is understood to include an orientation of parts that are actually parallel to one another or that deviate from being parallel by only a minor amount such as one to fifteen degrees. As used herein and in the claims the term "substantially perpendicular" is understood to include an orientation of parts that are actually perpendicular to one another or that deviate from being perpendicular by only a minor amount such as one to fifteen degrees. The arms 32, 33 may be permanently fixed to the pole or fixed to the pole in a detachable manner. It is understood that both forms of attachment are within the scope of the claims attached hereto. However, If the tool for installing a helicopter rotor blade tie down is to be transported in a smaller helicopter, for example a helicopter designed to seat not more than four persons, it is preferable that the arms be attached to the pole in a removable manner pole be an extendable pole so that the tool for installing a helicopter rotor blade tie down will fit more readily inside the passenger compartment of a helicopter. In the embodiment shown in the drawings the second section 18 of the pole has a pair of diametrically opposed parallel slots 28, 29 extending longitudinally from an end of the pole. The pole has a pair of diametrically opposed aligned passageways 21 extending therethrough with the passageway aligned with the slots 28, 29. A U shaped member 30 is attached to the pole in a detachable manner by extending one of the arms 32 of the U through the slots 28, 29 and one of the arms 33 through the passageways 21.

For convenience in storing and transporting the helicopter rotor blade tie down installation tool a storage container 35 may be provided that receives the telescoping pole in a collapsed state and the U shaped member detached from the pole. The storage container secures the helicopter blade tie down installation tool therein with a hook and loop closure 36.

A helicopter rotor blade tie down device 40 of the present invention is shown in FIGS. 2*a*, 3*a*, 3*b*, 4 and 4*a*. The blade tie down device 40 is a flat structure having two adjacent layers attached along three sides and open on one side 45 to facilitate the placement of an end of the helicopter rotor blade in an interior of the blade tie down device. The rotor blade tie down device has a basic structure that is a bag open on one end 45 with the opposite end 46 closed. Preferably the two adjacent layers comprise a fabric made of natural or synthetic fibers. It is understood that the basic structure of the rotor blade tie down device may be fabricated from a single piece of fabric that is folded over onto itself or from two separate superimposed pieces of fabric. In either case, all but one of the pairs of superimposed free edges are fixed together, by stitching or other appropriate means. While the basic structure of the rotor blade tie down device is shown as being rectangular, with one of the shorter sides being the open side, it is understood that the basic structure of the device may be square or even curved on one side.

Figure 3A:
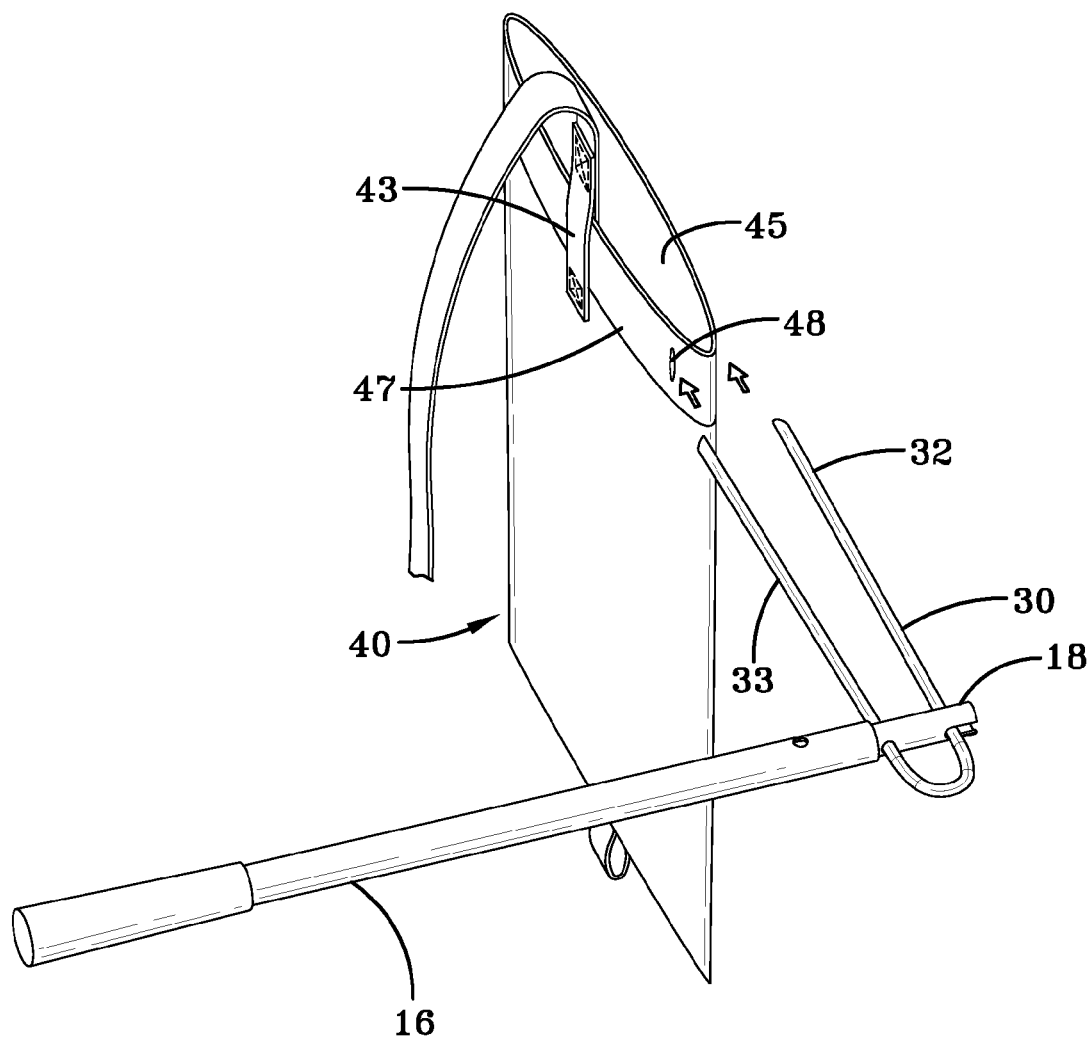
FIG. 3a shows the tool with the rotor blade tie down.
Figure 3B:
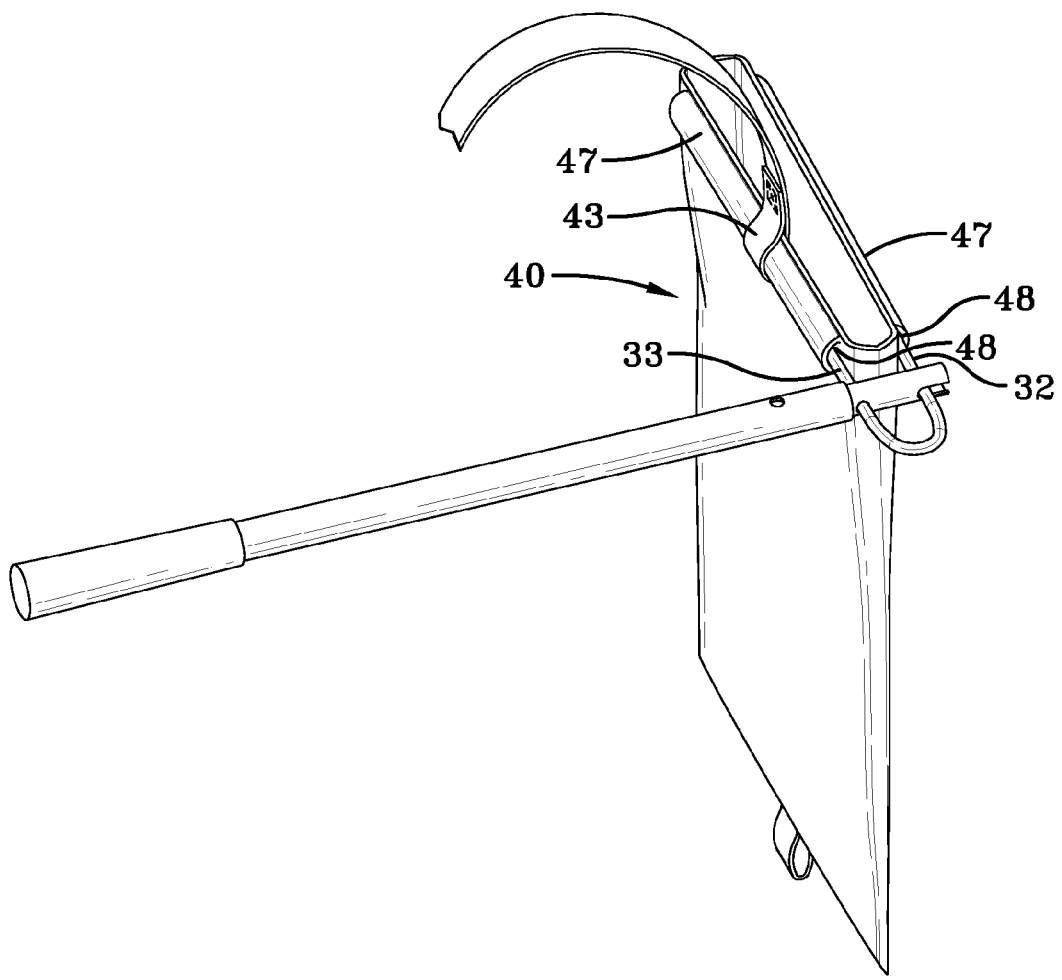
FIGS. 3b and 4 show the tool in its operative relationship with the rotor blade tie down.

The helicopter rotor blade tie down installation tool facilitates the placement of the rotor blade tie down device on the rotor blade even though a person standing on the ground cannot reach the rotor blade without assistance of such a device or standing on a ladder. An exterior surface of each of the layers of the flat structure has a member 47 fixed thereto adjacent the open side 45 of the flat structure for receiving a helicopter rotor blade tie down installation tool of the type described above. As shown the members for receiving a helicopter rotor blade tie down installation tool each comprise a sleeve 47 that extends parallel to the open side 45 of the flat structure, each sleeve 47 having an opening 48 for the receiving one of the spaced apart substantially parallel arms 32, 33 fixed to the pole of the helicopter rotor blade tie down installation tool. When each of the substantially parallel arms 32, 33 is place in one of the sleeves 47 the two adjacent layers are spaced apart at the open side 45 of the flat structure to facilitate the insertion of an end 13 of a helicopter rotor blade 12 into the helicopter rotor blade tie down device as shown in FIG. 3*b*. The helicopter rotor blade tie down installation tool is then moved in the direction of the arrow in FIG. 4 until an end of the rotor blade is adjacent the closed side 46 of the rotor blade tie down device. Thereafter the substantially parallel arms 32, 33 of the helicopter rotor blade tie down installation tool are removed from the sleeves 47 leaving the rotor blade tie down device on the rotor blade.

Figure 5:
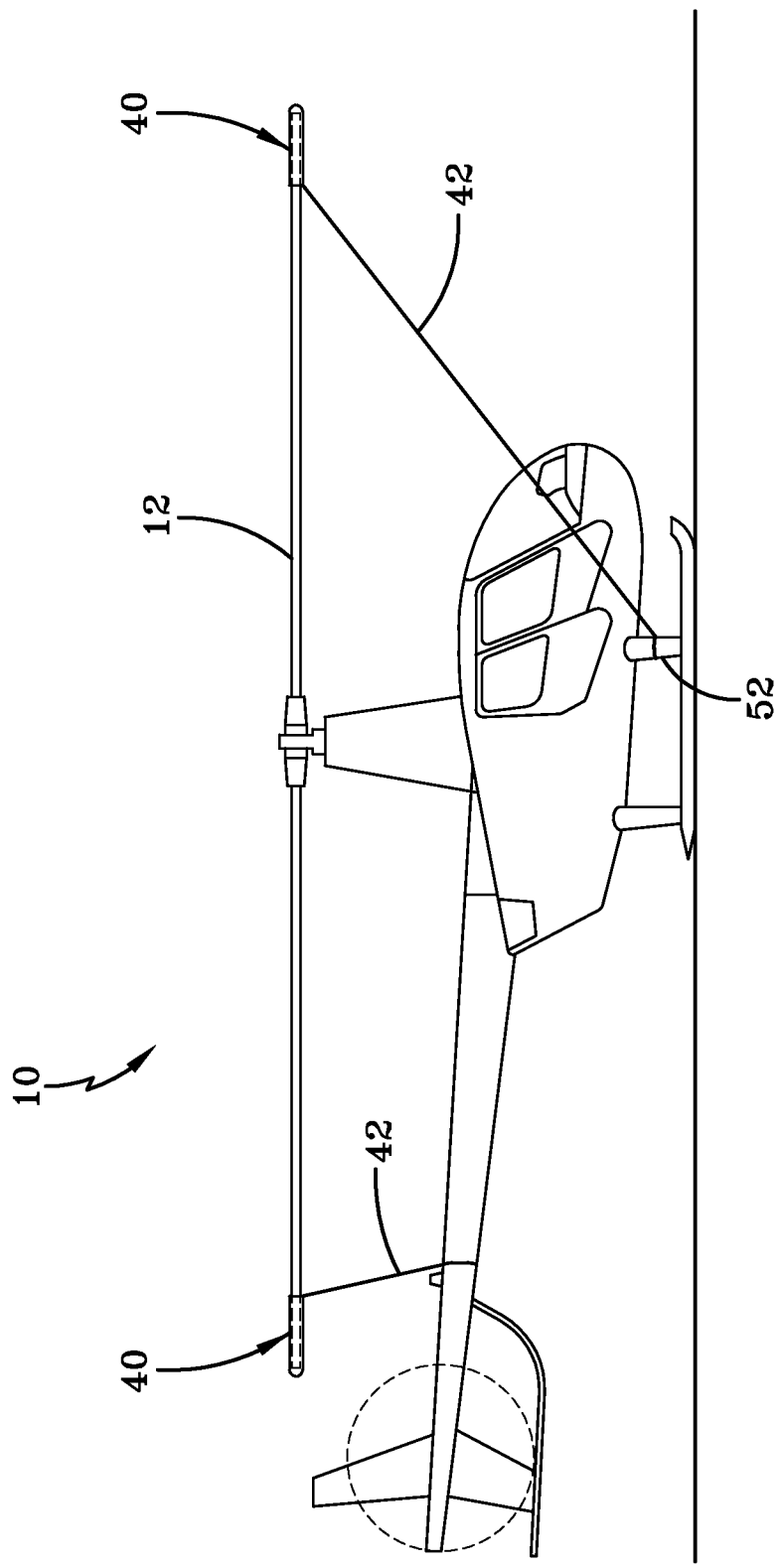
FIG. 5 is a side elevation view of the helicopter with the rotor blade tie down installed on a rotor blade and secured by a tether to a structural member of the helicopter.

An end of a tether 42 is fixed to the helicopter rotor blade tie down device 40 adjacent the open side 45 of the flat structure and one of the sleeves 47. A free end of the tether 42 is attached to a structural member 43 of the helicopter 10 that is located inboard of the helicopter with respect to the end of the rotor blade, thus restricting the amount of movement of the rotor blade. Preferably a rotor blade tie down device is placed on each rotor place of the helicopter as shown in FIG. 5. The tether may be attached to a structural member of the helicopter by any suitable means such as tying or using a snap hook.

Figure 6:
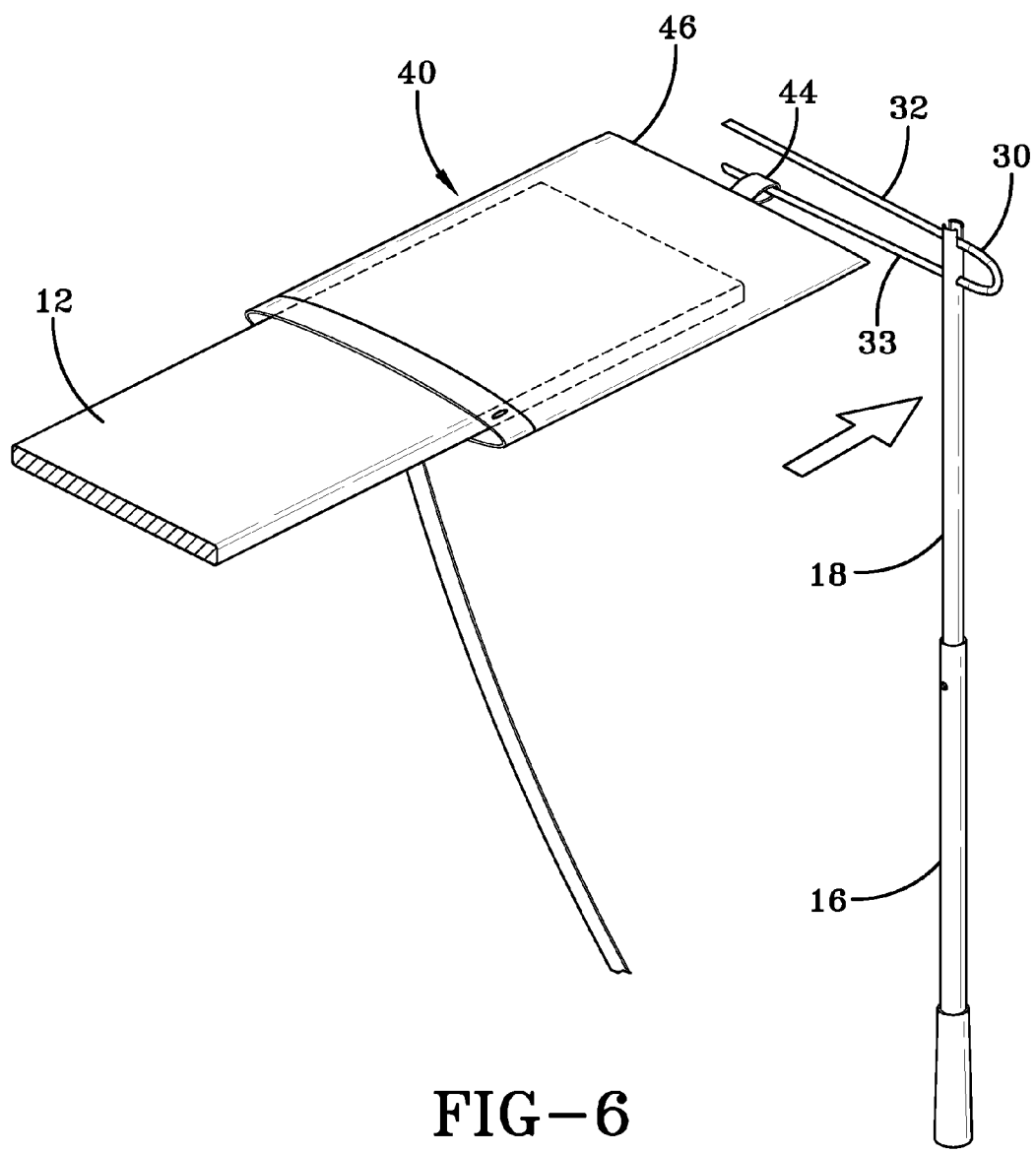
FIG. 6 shows the tool of FIG. 2 being used to remove the rotor blade tie down from a rotor blade.

A loop 44 is attached to the flat structure at a closed side 46 of the flat structure located opposite the open side 45 of the flat structure. The rotor blade tie down device is removed from the helicopter by first by releasing the tether from 42 from the structural member of the helicopter, then inserting one of the substantially parallel arms 32, 33 fixed to the pole of the helicopter rotor blade tie down installation tool through the loop 44 and pulling the rotor blade tie down device in the direction indicated by the arrow in FIG. 6.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A helicopter rotor blade tie down system comprising:
a flat structure having two adjacent fabric layers, each of the two fabric layers having four sides and being attached along three sides to the other fabric layer with the flat structure being open on one side to facilitate the placement of an end of the helicopter rotor blade in an interior of the device, an exterior surface of each of the two fabric layers of the flat structure having a sleeve fixed thereto adjacent the open side of the flat structure that extends parallel to the open side of the flat structure, each sleeve having an opening for receiving in the sleeve a component of a helicopter rotor blade tie down installation tool, and a tether having an anchored end of the tether fixed to the flat structure in the region of the open side of the flat structure and a free end of the tether, whereby the tether may be fixed to a structural member of the helicopter spaced apart from the helicopter rotor blade to place tension on the flat structure and restrict movement of the helicopter rotor blade; and
a helicopter rotor blade tie down installation tool comprising a pole having a pair of spaced apart substantially parallel arms fixed to the pole that extend away from the pole and are oriented substantially perpendicular to the pole to be received in members on the exterior of a helicopter rotor blade tie down device, the substantially parallel arms being spaced apart longitudinally with respect to a longitudinal axis of the pole, the substantially parallel arms are the arms of a U shaped member that is fixed to the pole in a detachable manner, the U shaped member being fixed to the pole with the base of the U shaped member proximal to the pole on a side of the pole distal from the substantially parallel arms in a manner whereby the arms remain attached to the pole when the pole is moved in a direction away from the arms, and the pole is hollow and has a pair of diametrically opposed parallel slots extending from an end of the pole, the pole has a pair of aligned passageways extending therethrough, and the U shaped member is attached to the pole in a detachable manner by extending one of the arms of the U through the slots and one of the arms through the passageways.

2. The helicopter rotor blade tie down system of claim 1 wherein the two adjacent fabric layers comprise a fabric made of natural or synthetic fibers.

3. The helicopter rotor blade tie down system of claim 1 wherein the tether is fixed to the flat structure adjacent the open side of the flat structure.

4. The helicopter rotor blade tie down system of claim 1 wherein the tether is fixed to the flat structure adjacent one of the sleeves.

5. The helicopter rotor blade tie down system of claim 1 further comprising a loop attached to the flat structure at a closed side of the flat structure located opposite the open side of the flat structure.

6. The helicopter rotor blade tie down system according to claim 1 wherein the pole is a telescoping pole.

7. A helicopter rotor blade tie down system comprising;
a flat structure having two adjacent fabric layers attached along three sides and open on one side, each of the fabric layers comprising a fabric made of natural or synthetic fibers, a loop attached to the flat structure at a closed side of the flat structure located opposite the open side of the flat structure, an exterior surface of each of the two fabric layers of the flat structure having a sleeve fixed thereto that extends parallel to and adjacent to the open side of the flat structure, each of the sleeves having an opening for receiving a component of a helicopter rotor blade tie down installation tool, and a tether having an anchored end of the tether fixed to the flat structure in the region of the open side of the flat structure and a free end of the tether, the tether may be fixed to a structural member of the helicopter spaced apart from the helicopter rotor blade to place tension on the flat structure and restrict movement of the helicopter rotor blade and the loop may be used for removing the flat structure from the helicopter blade when the tether is not fixed to a structural member of the helicopter spaced apart from the helicopter rotor blade; and
a helicopter rotor blade tie down installation tool comprising a pole having a pair of spaced apart substantially parallel arms fixed to the pole that extend away from the pole and are oriented substantially perpendicular to the pole to be received in members on the exterior of a helicopter rotor blade tie down device, the substantially parallel arms being spaced apart longitudinally with respect to a longitudinal axis of the pole, the substantially parallel arms are the arms of a U shaped member that is fixed to the pole in a detachable manner, the U shaped member being fixed to the pole with the base of the U shaped member proximal to the pole on a side of the pole distal from the substantially parallel arms in a manner whereby the arms remain attached to the pole when the pole is moved in a direction away from the arms, and the pole is hollow and has a pair of diametrically opposed parallel slots extending from an end of the pole, the pole has a pair of aligned passageways extending therethrough, and the U shaped member is attached to the pole in a detachable manner by extending one of the arms of the U through the slots and one of the arms through the passageways.

8. The helicopter rotor blade tie down system according to claim 7 wherein the pole is a telescoping pole.

9. A helicopter rotor blade tie down installation tool comprising a pole having a pair of spaced apart substantially parallel arms fixed to the pole that extend away from the pole and are oriented substantially perpendicular to the pole to be received in members on the exterior of a helicopter rotor blade tie down device, the substantially parallel arms being spaced apart longitudinally with respect to a longitudinal axis of the pole, the substantially parallel arms are the arms of a U shaped member that is fixed to the pole in a detachable manner, the U shaped member being fixed to the pole with the base of the U shaped member proximal to the pole on a side of the pole distal from the substantially parallel arms in a manner whereby the arms remain attached to the pole when the pole is moved in a direction away from the arms, and the pole is hollow and has a pair of diametrically opposed parallel slots extending from an end of the pole, the pole has a pair of aligned passageways extending therethrough, and the U shaped member is attached to the pole in a detachable manner by extending one of the arms of the U through the slots and one of the arms through the passageways.

10. The helicopter rotor blade tie down installation tool according to claim 9 wherein the pole is a telescoping pole.

11. The helicopter blade tie down installation tool of claim 10 in combination with a storage container that receives the telescoping pole in a collapsed state and the U shaped member detached from the pole, and the storage container secures the helicopter blade tie down installation tool therein with a hook and loop closure.

* * * * *